: US 10,085,545 B2
(45) Date of Patent: Oct. 2, 2018

(12) United States Patent
Tran et al.

(54) STABILIZED SHOULDER MOUNT FOR ELECTRONIC DEVICE (71) Applicant: MOTOROLA SOLUTIONS, INC., Schaumburg, IL (US)

(72) Inventors: Chi T. Tran, Weston, FL (US); Ryan M. Nilsen, Pompano Beach, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 190 days.

(21) Appl. No.: 14/918,275

(22) Filed: Oct. 20, 2015

(65) Prior Publication Data

US 2017/0105510 A1    Apr. 20, 2017

(51) Int. Cl.
*A45F 5/02* (2006.01)
*F16M 13/04* (2006.01)

(52) U.S. Cl.
CPC ............... *A45F 5/02* (2013.01); *F16M 13/04* (2013.01); *A45F 2005/023* (2013.01)

(58) Field of Classification Search
CPC ..... A45F 5/02; A45F 2005/023; F16M 13/04; A44B 17/0041; A44B 99/00
USPC ................................ 224/182, 264, 194, 250
See application file for complete search history.

(56) References Cited

U.S. PATENT DOCUMENTS

| | | | | |
|---|---|---|---|---|
| 2,372,971 A | * | 4/1945 | Moore | H04R 25/04 224/624 |
| 2,487,423 A | * | 11/1949 | Cast | A41D 27/26 2/460 |
| 2,506,685 A | * | 5/1950 | Checkowitz | A45F 5/00 224/185 |
| 2,641,760 A | * | 6/1953 | Syracuse | A45F 3/12 2/323 |
| 3,648,906 A | * | 3/1972 | Ross | A45F 5/00 224/587 |
| 3,799,413 A | * | 3/1974 | McBain | A45F 3/12 224/264 |

(Continued)

FOREIGN PATENT DOCUMENTS

| | | |
|---|---|---|
| CN | 104344192 | 2/2015 |
| CN | 204240007 | 4/2015 |

(Continued)

OTHER PUBLICATIONS

PCT/US2016/052518 International Search Report and Written Opinion of the International Searching Authority dated Dec. 22, 2016 (12 pages).

(Continued)

*Primary Examiner* — Nathan J Newhouse
*Assistant Examiner* — Lester L Vanterpool (57) ABSTRACT

A shoulder harness for supporting an electronic device includes a substrate having a pre-formed curvature such that the shoulder harness is biased to an at-rest state that is concave on a bottom-facing surface. A crest portion includes at least one slit adapted to secure the shoulder harness to a fastening element on a garment or other body-worn device. A front portion is coupled to the crest portion and extends in a forward direction from the crest portion. The front portion includes a receiving opening for attachment of the electronic device. A rear portion is coupled to the crest portion and extends in a rearward direction from the crest portion.

26 Claims, 10 Drawing Sheets

(56) References Cited

U.S. PATENT DOCUMENTS

| | | | | |
|---|---|---|---|---|
| 3,893,604 | A * | 7/1975 | Skinner | A45F 5/00 224/257 |
| 4,091,975 | A | 5/1978 | Russell, Jr. | |
| 4,168,544 | A * | 9/1979 | Kallman | A41D 27/00 2/94 |
| 4,244,500 | A * | 1/1981 | Fournier | A45F 5/00 224/201 |
| 4,260,089 | A * | 4/1981 | Daleo | A45F 5/02 224/264 |
| 4,580,707 | A * | 4/1986 | Shoemaker | F41C 33/0209 224/193 |
| 4,721,238 | A * | 1/1988 | Shoemaker | F41C 33/0227 224/243 |
| 4,895,286 | A | 1/1990 | DeRosa | |
| 4,963,904 | A * | 10/1990 | Lee | A45F 5/00 224/201 |
| 5,263,618 | A * | 11/1993 | Talavera | A45F 3/14 224/148.2 |
| D373,018 | S * | 8/1996 | Alberti | D3/218 |
| 5,612,756 | A * | 3/1997 | Kardach | F16M 13/04 396/422 |
| 6,209,769 | B1 * | 4/2001 | Seals | A45C 1/04 224/583 |
| 6,390,346 | B1 * | 5/2002 | Thomas | A45F 3/14 224/236 |
| 6,543,661 | B1 * | 4/2003 | Lazur | A45F 3/14 224/604 |
| 7,090,102 | B1 * | 8/2006 | Lipke | A45F 5/02 2/247 |
| D547,942 | S * | 8/2007 | Lavine | D3/218 |
| 7,370,781 | B2 * | 5/2008 | Gambrill | A45F 5/00 224/583 |
| 8,479,958 | B1 * | 7/2013 | Swift | A45F 3/02 224/257 |
| 8,800,829 | B2 * | 8/2014 | Bergenudd | A45F 3/12 224/201 |
| 2006/0011688 | A1 * | 1/2006 | Duncan | A45F 3/14 224/602 |
| 2008/0010715 | A1 * | 1/2008 | Menzel | A45F 3/04 2/69 |
| 2012/0046083 | A1 * | 2/2012 | Klett | H04B 1/385 455/569.1 |
| 2013/0200117 | A1 * | 8/2013 | Monro | A45F 5/02 224/183 |
| 2015/0086175 | A1 | 3/2015 | Lorenzetti | |

FOREIGN PATENT DOCUMENTS

| | | |
|---|---|---|
| GB | 2425185 | 10/2006 |
| WO | 98/20273 | 5/1998 |
| WO | 2011/156004 | 12/2011 |

OTHER PUBLICATIONS

NEOPine SCM—2 Adjustable Single Shoulder Strap Chest Gopro Mount Stabilizer Action Cameras Supplies http://www.gearbest.com/camping/pp_106537.html (accessed Oct. 15, 2015).

Wolfcom Mini-Shoulder Mount http://www.wolfcomusa.com/police-camera-accessories/police_body_camera_accessories.html (accessed Oct. 15, 2015).

* cited by examiner

STABILIZED SHOULDER MOUNT FOR ELECTRONIC DEVICE

BACKGROUND OF THE INVENTION

The use of wearable electronics, including cameras among other devices, has increased in recent times. Whether for sport, leisure, or police/military use, there is often a need to secure an electronic device on the body of a user so that the device is located at an elevated location on the body with a wearable device. However, currently available solutions are not adaptable to a variety of users, or are cumbersome to wear, and often do not provide enough resistance against movement relative to the user's body when in motion.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In some aspects, a shoulder harness for supporting an electronic device includes a substrate having a pre-formed curvature such that the shoulder harness is biased to an at-rest state that is concave on a bottom-facing surface. A crest portion includes at least one slit adapted to secure the shoulder harness to a fastening element on a garment or other body-worn device. A front portion is coupled to the crest portion and extends in a forward direction from the crest portion. The front portion includes a receiving opening for attachment of the electronic device. A rear portion is coupled to the crest portion and extends in a rearward direction from the crest portion.

In some aspects, a shoulder harness for supporting an electronic device includes a substrate having a pre-curved compound curvature. The shoulder harness includes multiple spaced-apart tethering locations, each tethering location defined by one portion of a two-piece fastener adapted to positively secure the shoulder harness with a garment or other wearable device including the other portion of the two-piece fastener. A covering has a non-slip texture on a concave underside of the shoulder harness.

Figure 1:
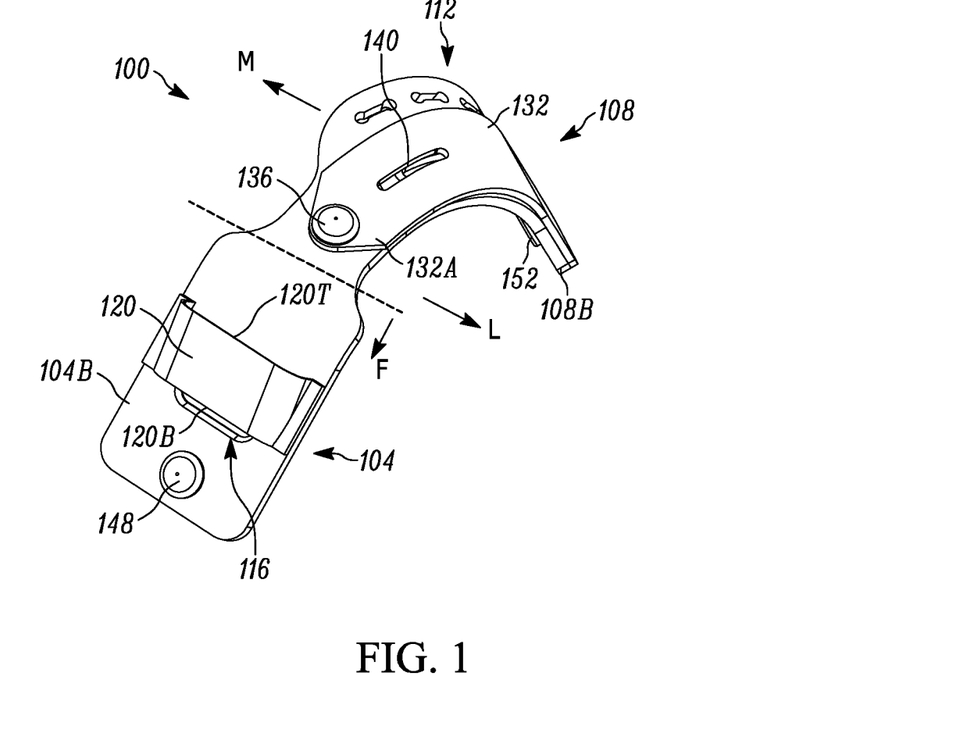
FIG. 1 is a perspective view of a shoulder mount in accordance with some embodiments.

FIG. 1 illustrates a shoulder harness 100 according to a first construction. The shoulder harness 100 is wearable over the shoulder of a human user to provide a stable mount for supporting an electronic device upon the body of the user. The disclosure is not limited to an electronic device of a particular type, but rather has wide application to all types of electronic devices that may be supported on a human user. One particular use of the shoulder harness 100 illustrated in the accompanying drawings is the mounting of a camera, particularly a camera operable to record video while supported on the body of the user. Furthermore, such a camera may be incorporated into a remote speaker microphone ("RSM") device, often utilized by law enforcement. The shoulder harness 100 may include a variety of features, as described in detail below that particularly enhance the use of electronic devices such as cameras and RSMs, among many others.

Figure 2:
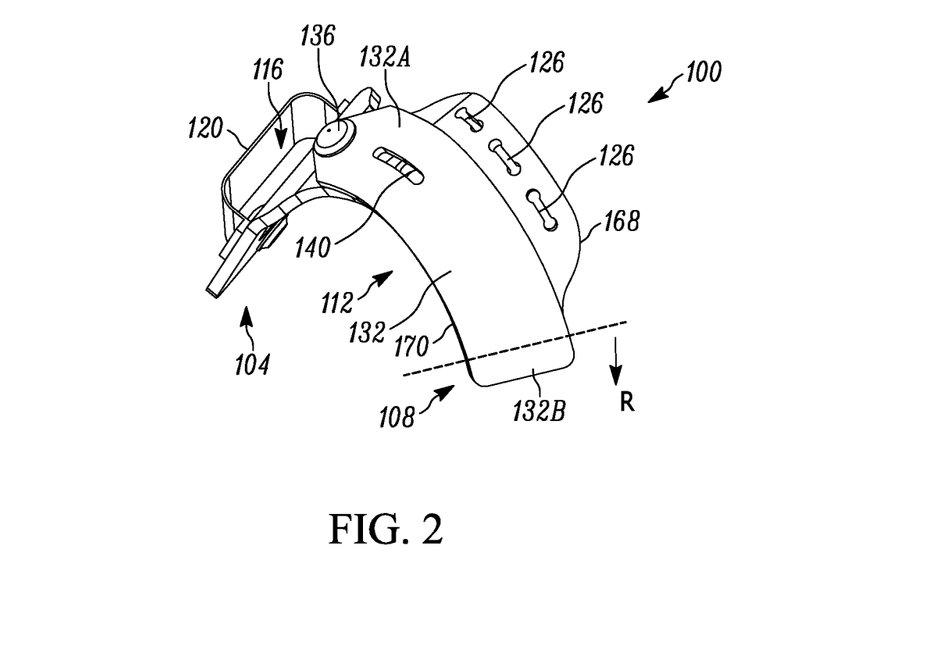
FIG. 2 is a further perspective view of the shoulder mount of FIG. 1.

In order to enhance stability, the shoulder harness 100 is pre-formed to fit over the top of the shoulder of a human body. The shoulder harness 100 is shaped as an inverted letter "J". Due to this shape, the shoulder harness 100 includes a first leg (a long leg of the "J", forming a front portion 104), a second leg (a short leg of the "J", forming a rear portion 108), and a crest portion 112 extending between the front and rear portions 104, 108. The front portion 104 extends from the crest portion 112 in a forward direction F (FIG. 1) and the rear portion 108 extends from the crest portion 112 in a rearward direction R (FIG. 2). The transitions between the crest portion 112 and the front and rear portions 104, 108, respectively, may be shown by the dashed lines in FIGS. 1 and 2. In some constructions, the front and rear portions 104, 108 exhibit an outer profile shape changes from the crest portion 112 at the respective transitions, but this is not necessarily required. Although pre-formed to the inverted "J" shape as mentioned, defining a natural or at-rest state, the shoulder harness 100 is resiliently flexible to allow the two opposed legs of the "J" to move toward and away from each other. The at-rest state of the shoulder harness 100 may be shaped and sized to require a slight opening force to fit over an average-sized shoulder. As such, the shoulder harness 100 is elastically stretched and exhibits a small clamping force on the shoulder of the user. As discussed hereinafter with respect to FIG. 10, a substrate 114 provides a core of the shoulder harness 100 and imparts the pre-formed shaped and elastic properties to the shoulder harness 100.

Figure 5:
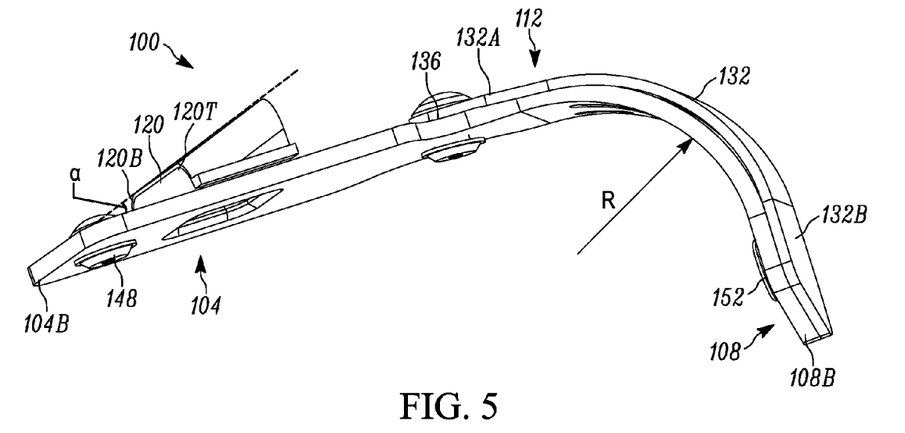
FIG. 5 is a left side view of the shoulder mount of FIGS. 1 through 4.
Figure 6:
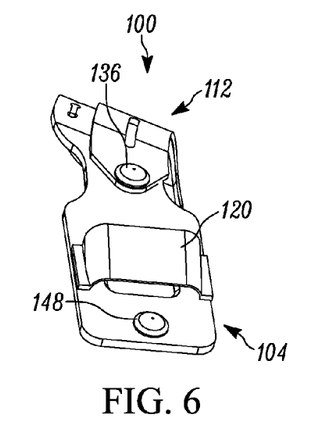
FIG. 6 is a front view of the shoulder mount of FIGS. 1 through 5.

The front portion 104 includes at least one structure for attachment of the electronic device. As illustrated, the front portion 104 includes a receiving opening 116 for attachment of the electronic device. In particular, the receiving opening 116 may be defined at least in part by a strap 120 extending in a direction transverse to forward direction F and having opposing ends fixed relative to the substrate 114 to define a loop therebetween. The strap 120 provides a universal mounting location for a wide array of electronic devices, and optionally electronic device cradles. For example, the shoulder harness may be used by a wide variety of belt clip devices, any of which may engage the strap 120 and be at least partially received in the receiving opening 116. Referring to FIG. 5, the strap 120 includes a top edge 120T and a bottom edge 120B, the top edge 120T being nearer the crest portion 112. The strap 120 may be angled relative to the substrate 114 such that the top edge 120T is further from the substrate 114 than the bottom edge 120B in order to obtain a desirable orientation for the electronic device when worn on the body with the shoulder harness 100. In side view, as shown in FIG. 5, the angle α between the strap 120 and the substrate 114 may be 15 degrees +/−5 degrees. In other constructions, the angle α (FIG. 5) between the strap 120 and the substrate 114 may be between 0 degrees and 30 degrees. In other constructions, the angle α (FIG. 5) between the strap 120 and the substrate 114 may be between 5 degrees and 20 degrees.

Figure 3:
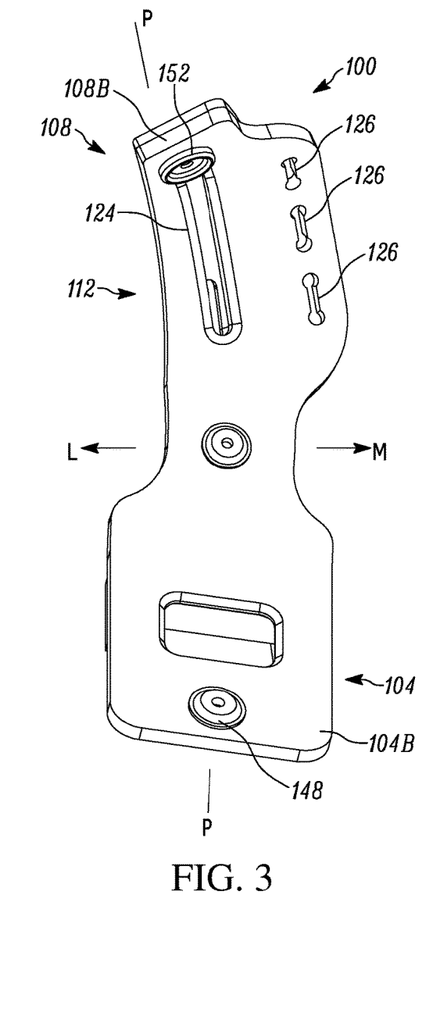
FIG. 3 is a bottom view of the shoulder mount of FIGS. 1 and 2.
Figure 4:
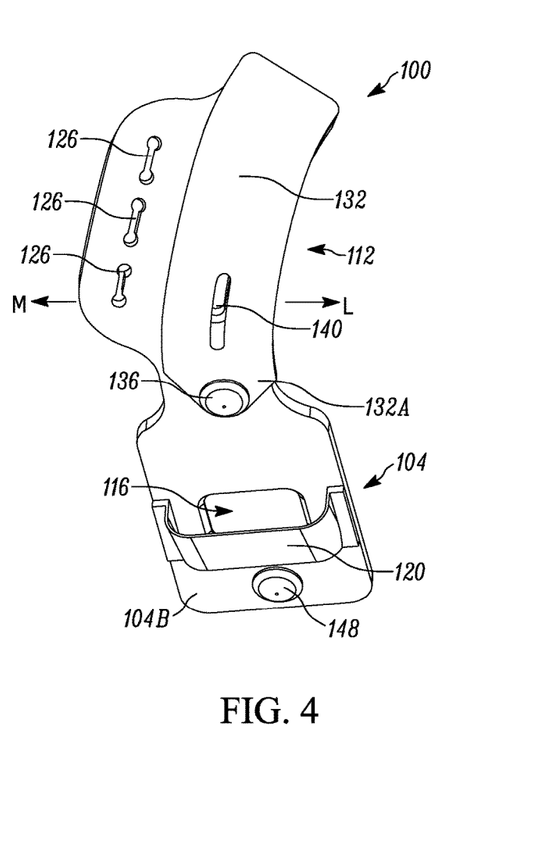
FIG. 4 is a top view of the shoulder mount of FIGS. 1 through 3.

The crest portion 112 is provided with multiple features for positively engaging a structure provided on a garment or other body-worn device (e.g., harness, strap, girdle, band, etc.) worn by the user under the shoulder harness 100. This provides the shoulder harness 100 with multiple tethering locations. For example, as shown in FIG. 3, the crest portion 112 includes a slit 124 that is elongated to extend (e.g., between 1 inch and 6 inches) in a direction of extension of the crest portion 112 between the front and rear portions 104, 108. The crest portion 112 may also include at least one additional slit 126 (e.g., three additional slits, FIG. 2) positioned alongside the slit 124. The additional slits 126 may be aligned with each other along an axis parallel with the first slit 124. When referring to such an axis, it will be understood that axes defining the directions of the slits 124, 126 are curved to follow the curved profile of the crest portion 112. In some embodiments, the first slit 124 may be longer than the additional slits 126. The first slit 124 may be centrally located along a central dividing plane P (FIG. 3) that divides the front and/or rear portions 104, 108 equally widthwise. The additional slits 126 may be spaced away from the central dividing plane P and may be located in a side extension of the crest portion 112 that projects out in a medial direction M, opposite a lateral direction L as defined by the anatomical shape. Any other construction of the slits 124, 126 is also within the scope of the present disclosure. The first slit 124 may be adapted to receive a shoulder epaulette of a garment (e.g., uniform shirt, jacket, etc.) therethrough. For example, the epaulette may have a detachable end that is released, passed through the first slit 124, and then re-attached with the garment. As such, the shoulder harness 100 is positively engaged with the garment via the epaulette and the first slit 124, and only a limited amount of movement is possible between the shoulder harness 100 and the garment. Although reference is made in several places herein to a garment epaulette as an exemplary use, it will be appreciated that the structure of the shoulder harness 100 is not limited to being mounted via an epaulette, or even limited to a garment.

In order to further limit the range of possible movement between the shoulder harness 100 and the garment, additional fastening may be provided therebetween via at least one of the additional slits 126. The implementation of optimal construction may be dependent upon usage. For example, a button may be provided at a fixed position on the garment, and the shoulder harness 100 may be slid forward or backward, within the range of travel of the epaulette in the first slit 124, to align the button with one of the additional slits 126. The button is then passed through the selected slit 126 to further secure the position of the shoulder harness 100 with respect to the garment, and with respect to the user wearing the garment. Although described as slits 126 engageable with a button, this represents one common type of two-piece fastener, and it will be recognized that other types of two-piece fasteners may be used in lieu of a button and slit. As such, each of the slits 126 may be replaced with one piece of an alternate type of two-piece fastener (e.g., one portion of a snap fastener, magnetic fastener, hook-and-loop fastener, etc.) engageable with the other corresponding piece of the two-piece fastener provided on the garment. Regardless of type, the two-piece fastener may be operable (i.e., to attach and release) by hand without the use of tools. The two-piece fastener may be of a "binary" type that provides two discrete conditions, secured and unsecured, without variable degrees of engagement or tightening, etc.

Figure 8:
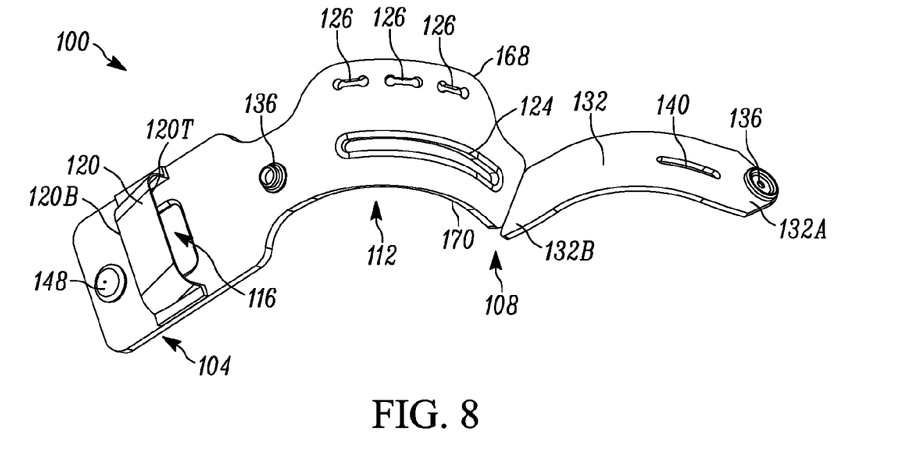
FIG. 8 is a perspective view of the shoulder mount of FIGS. 1 through 7, having an outer strap in an open position.
Figure 9:
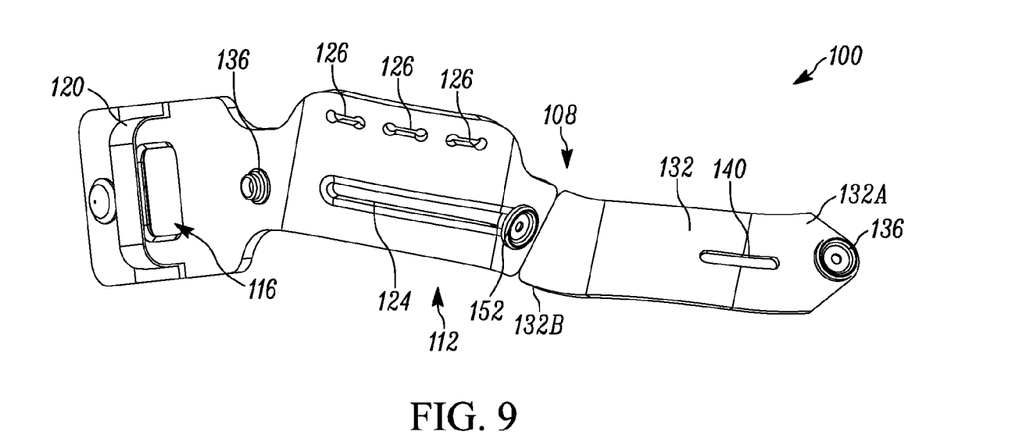
FIG. 9 is a top view of the shoulder mount of FIGS. 1 through 8, having the outer strap in the open position.

Additional or alternate securement of the shoulder harness 100 may be provided by a strap 132 spanning the crest portion 112. The strap 132 may have a pair of strap ends 132A, 132B securable with respect to the substrate 114. At least one of the strap ends (e.g., the forward strap end 132A) is securable with a fastener 136 (e.g., a binary type fastener, operable by hand). As shown, the fastener 136 is a two-piece snap fastener. The fastener 136 selectively allows the strap 132 to move from an open condition (FIGS. 8 and 9) allowing movement of the strap 132 away from the crest portion 112 and a closed condition (FIGS. 1-7) preventing movement of the strap 132 away from the crest portion 112. Although the opposite (e.g., rear) strap end 132B may also be provided with a similar detachable fastener, it may be permanently secured (e.g., sewn) to the crest portion 112 or to the rear portion 108 as shown. In some constructions, a slit 140 or other fastening structure may be provided in the strap 132. In the case of a fixed epaulette, the strap 132 allows the epaulette to be received between the crest portion 112 and the strap 132 with the two-piece fastener 136 is released. Securing the fastener 136 then traps the epaulette to positively secure the shoulder harness 100 relative to the garment. The slit 140 in the strap 132 may receive a button fixed on the epaulette to further limit the range of motion of the shoulder harness 100 relative to the garment. As shown by a further construction in FIGS. 11 through 18, the strap 132 may be eliminated to simplify the shoulder harness for applications in which it is not required.

In addition to the multiple structures provided at the crest portion 112 for securing the shoulder harness 100 to a garment or other body-worn device, one or both of the front and rear portions 104, 108 may include at least one additional structure defining at least one additional tethering location. For example, the front portion 104 includes a bottom end 104B spaced remotely from the crest portion 112, and one piece 148 of a two-piece fastener is provided adjacent the bottom end 104B. Similarly, the rear portion 108 includes a bottom end 108B spaced remotely from the crest portion 112, and one piece 152 of a two-piece fastener is provided adjacent the bottom end 108B. Each of the fastener pieces 148, 152 may be a part of a binary type fastener, operable by hand, or in some instances by another mechanism. As shown, each of the fastener pieces 148, 152 is part of a two-piece snap fastener. The corresponding mating parts securable with the fastener pieces 148, 152 may be fixedly attached to the garment or other body-worn device at predetermined locations to define the final positioning of the shoulder harness 100 on the body. For example, snap fastener pieces corresponding to the fastener pieces 148, 152 may be hammered into a garment or other body-worn device at precise locations once the desired position of the shoulder harness 100 is determined. Not all tethering locations described above are necessarily required in all constructions, and in fact, may be provided in any possible combination as suited to the final application. However, the shoulder harness 100 exhibits greatly improved stabilization with respect to the user's body by providing multiple, spaced apart tethering locations, including one or more in the crest portion 112, and at least one adjacent the bottom end 104B, 108B of the front and/or rear portions 104, 108.

In addition to the multiple tethering locations described above, the shoulder harness 100 may be provided with a non-slip texture on the concave side that receives the shoulder. For example, referring to FIG. 10, the exterior surfaces of the shoulder harness 100 may be provided by a covering 158A, 158B that extends over the substrate 114, and the covering 158A, 158B may be provided at the concave or bottom-facing surface with a non-slip texture. The non-slip texture enhances surface friction to inhibit slippage without being tacky or forming a bond, as with an adhesive. In some constructions, the bottom-facing surface of the covering 158A, 158B is constructed of rubberized vinyl or a non-grain leather surface (e.g., split leather or flesh side of top grain or full grain leather). In contrast, the convex or top-facing surface of the covering 158A, 158B may be constructed of a leather or textile material having a smooth, uniform texture.

Figure 10:
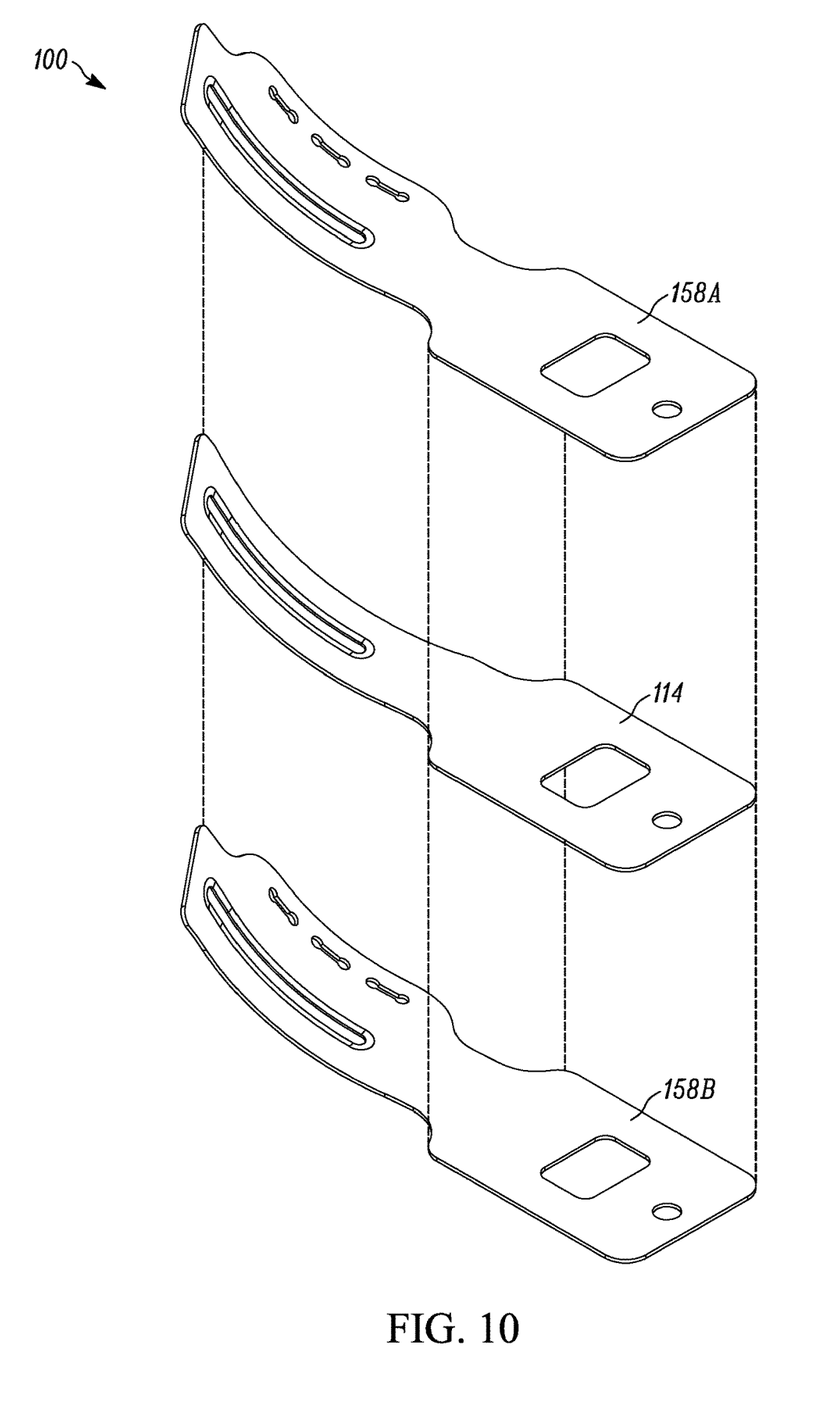
FIG. 10 is an exploded assembly view of the shoulder mount of FIGS. 1 through 9.
Figure 11:
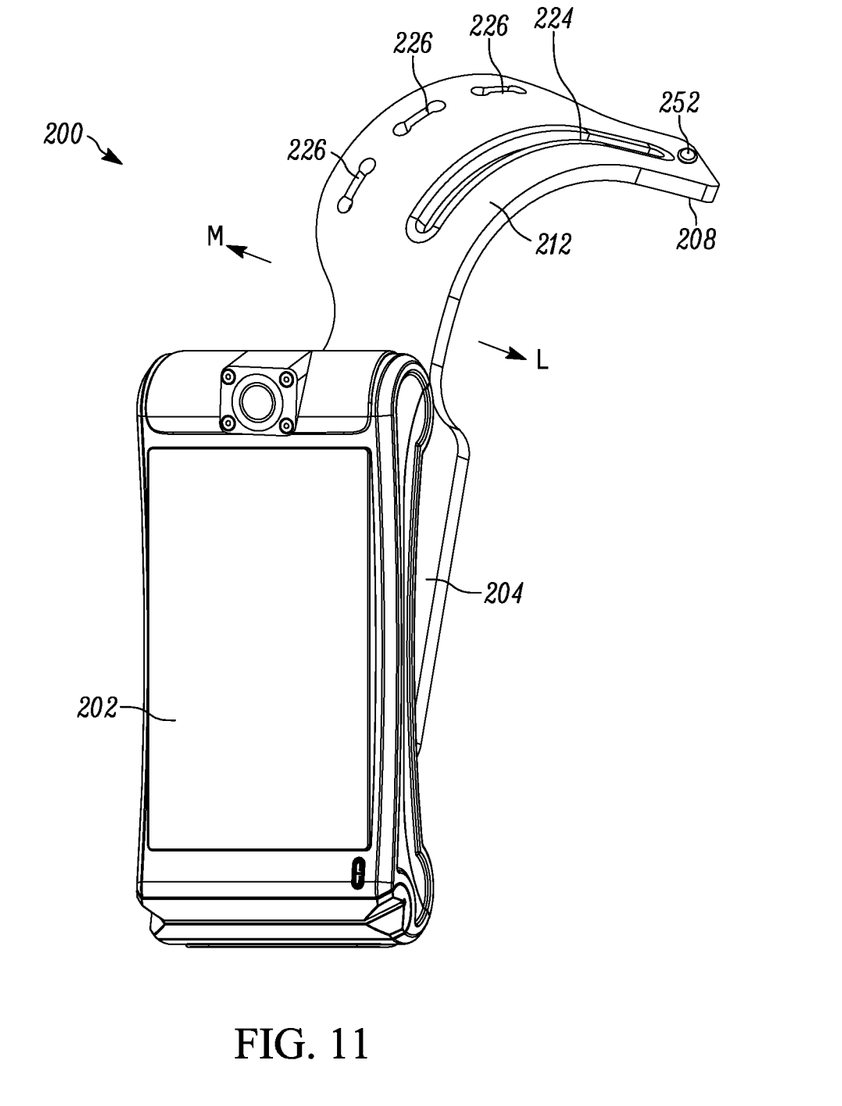
FIG. 11 is a perspective view of a shoulder mount in accordance with some embodiments, shown supporting an electronic device.
Figure 12:
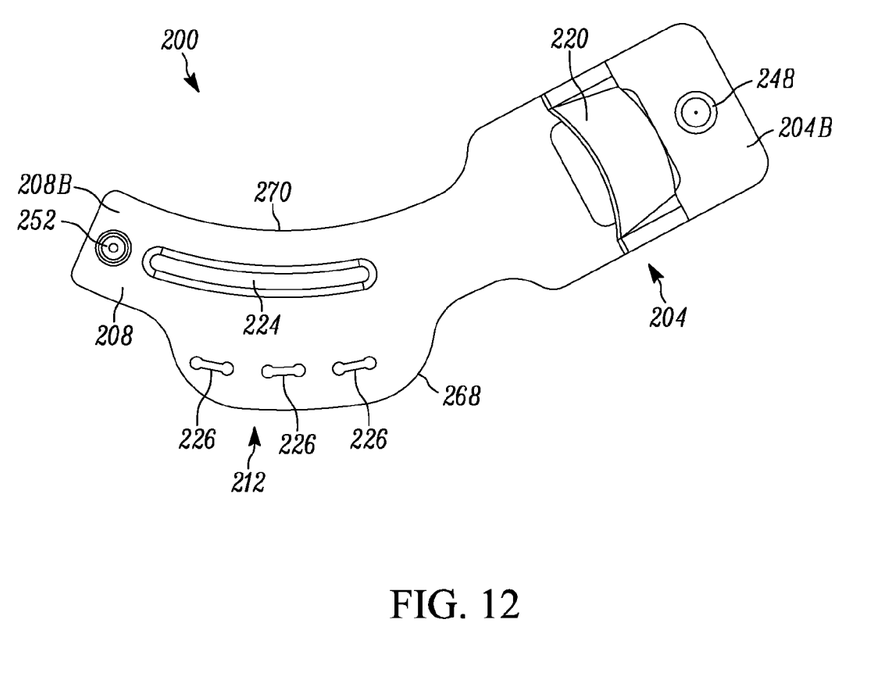
FIG. 12 is a top view of the shoulder mount of FIG. 11, illustrated in a flattened condition.

As shown in FIG. 10, the covering 158A, 158B may be manufactured from two separate pieces 158A, 158B that are assembled together on opposing sides of the substrate 114 in a sandwich construction. In other constructions, the covering may be constructed as one piece with two separate portions to cover the opposing sides of the substrate 114 (e.g., the covering may be folded over at one edge). The covering may be secured upon itself and/or to the substrate 114 in order to partially or fully encase the substrate 114 therein. Although the covering 158A, 158B may be formed to have a pre-defined curvature, the covering 158A, 158B may be constructed of flexible but flat material strips, while the substrate 114 is relied upon to impart the pre-formed curvature to the shoulder harness 100.

Figure 7:
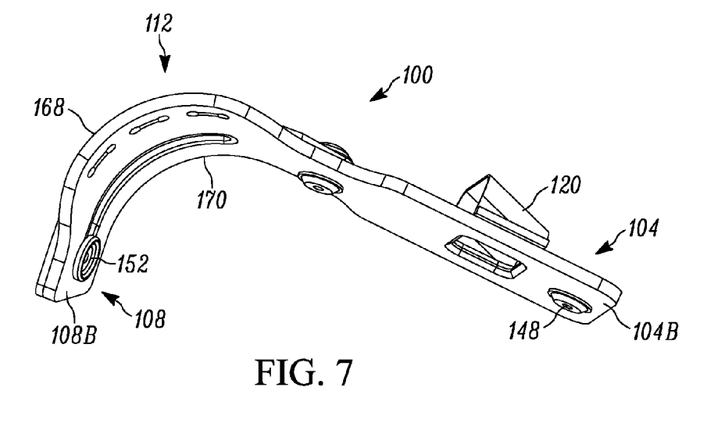
FIG. 7 is a right side view of the shoulder mount of FIGS. 1 through 6.

As shown in FIG. 10, the substrate 114 may be formed prior to assembly with the covering 158A, 158B to have the "J" shape. In some constructions, the substrate 114 may be a thermoformed plastic sheet. To provide a more anatomical shape, the shoulder harness 100 does not simply have a basic "J" shape, but rather a compound curvature. For example, the "J" shape generally represents a front-to-rear curvature profile, and the crest portion 112 further has a tapered conical shape extending parallel to the medial and lateral directions M, L (i.e., along a medial-lateral axis). The description of the shape characteristics refer to the at-rest state, while the shoulder harness 100 is elastically flexible to conform to the actual shoulder profile of the individual wearer. A wider portion of the tapered conical shape defines a medial-facing edge 168 of the shoulder harness 100, and a narrower portion of the tapered conical shape defines a lateral-facing edge 170 of the shoulder harness 100 as best seen in FIG. 7. Although the conical taper results in different curvature radii at different points along the medial-lateral axis, a radius R (FIG. 5) of the bottom-facing surface at least within the crest portion 112 may be between 45 millimeters (mm) and 60 mm, and in some constructions between 50 mm and 55 mm. It will be appreciated that the radius R alternatively may be any required dimension as best fits the implementation.

FIGS. 11 through 18 illustrate an alternate construction of a shoulder harness 200 that is similar in most respects to the shoulder harness 100 described above. Thus, reference numerals for similar features are re-used, incremented by 100, and a full description of the features is not reiterated herein. One major distinction of the shoulder harness 200 is the elimination of the strap 132 spanning the crest portion 112 on the shoulder harness 100 of FIGS. 1 through 10. Although the strap 132 provides additional adaptability for some types of garments or other body-worn devices, it may be unnecessary for use with a device (e.g., an epaulette) having a detachable end that may be threaded through the slit 124, 224. The shoulder harness 200 is shown supporting an exemplary electronic device 202 (e.g., a remote speaker microphone) in FIG. 11. Although not suitable for use in the configuration of FIG. 12, this drawing view illustrates a shape of the shoulder harness 200, viewed from the top, when flexed from the at-rest "J" shape to a flat orientation. FIGS. 13 through 18 illustrate the shoulder harness 200 coupled to two different styles of uniforms having epaulettes.

Figure 13:
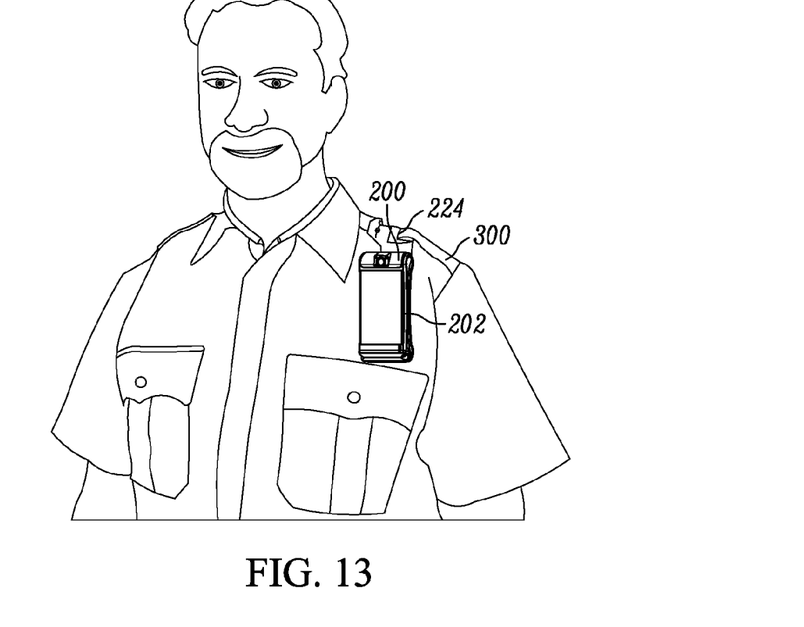
FIG. 13 is a front view of a person in a first uniform wearing the shoulder mount of FIGS. 11 through 12 to support the electronic device.
Figure 14:
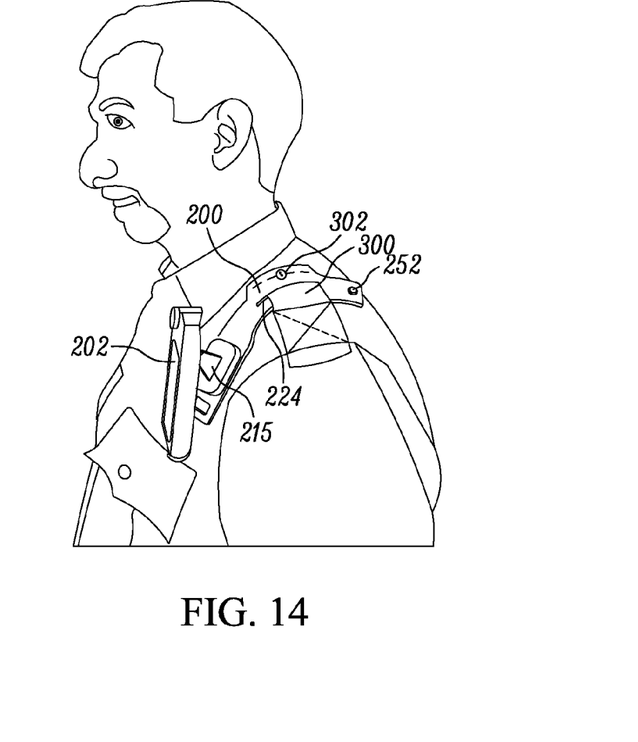
FIG. 14 is a side view of the person in the first uniform wearing the shoulder mount of FIGS. 11 through 12 to support the electronic device.
Figure 15:
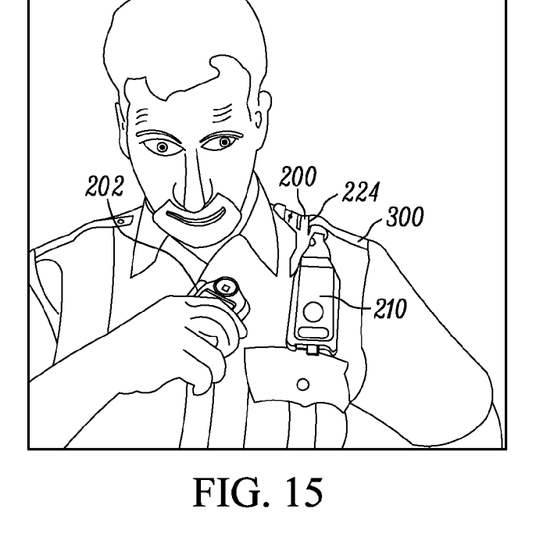
FIG. 15 is a front view of the person in the first uniform wearing the shoulder mount of FIGS. 11 through 12, the electronic device shown in use, removed from a cradle mounted to the shoulder mount.

As shown in FIGS. 13 through 15, the uniform includes a shoulder epaulette 300 having a fixed lateral end and a detachable medial end. When detached at the medial end, the epaulette may be threaded into the slit 224 to provide a first tethering location between the shoulder harness 200 and the uniform. Once in a desired position along the epaulette 300, the shoulder harness 200 is further secured with one or more additional tethering locations. For example, a button 302 of the uniform may be engaged with one of the slits 226 as shown. Additional tethering locations may be established at one or both of the bottom ends 204B, 208B of the front and rear portions 204, 208 by a respective fastener piece 248, 252 of a two-piece fastener (e.g., snaps) as described with respect to the fastener pieces 148, 152 of the shoulder harness 100 described above. FIGS. 14 and 15 illustrate that the electronic device 202 is supported on the shoulder harness 200 by a cradle 210 having a clip 215 that engages the strap 220.

Figure 16:
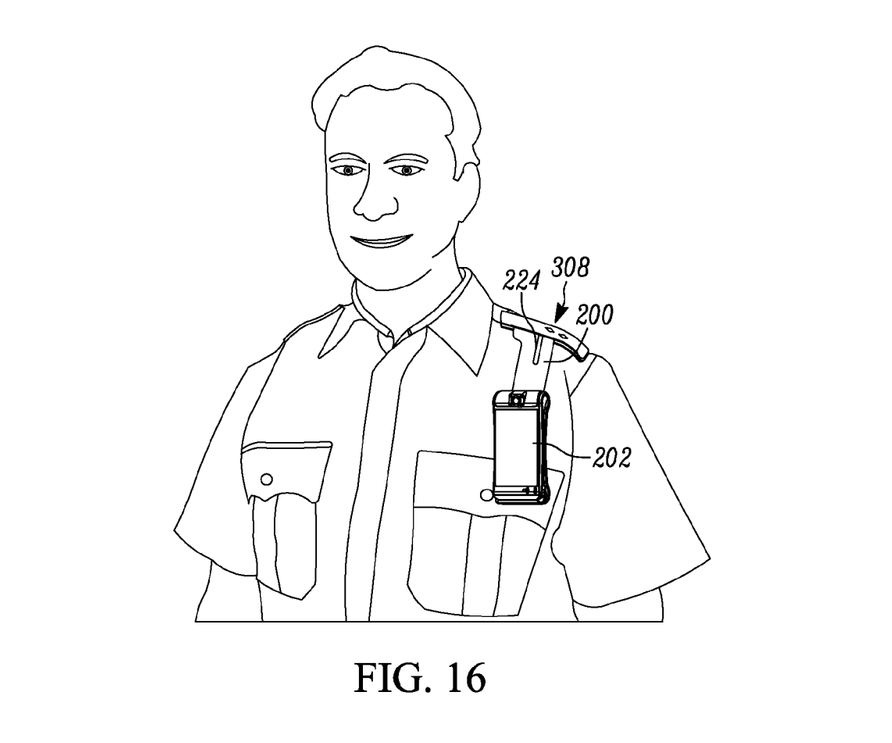
FIG. 16 is a front view of a person in a second uniform wearing the shoulder mount of FIGS. 11 through 12.
Figure 17:
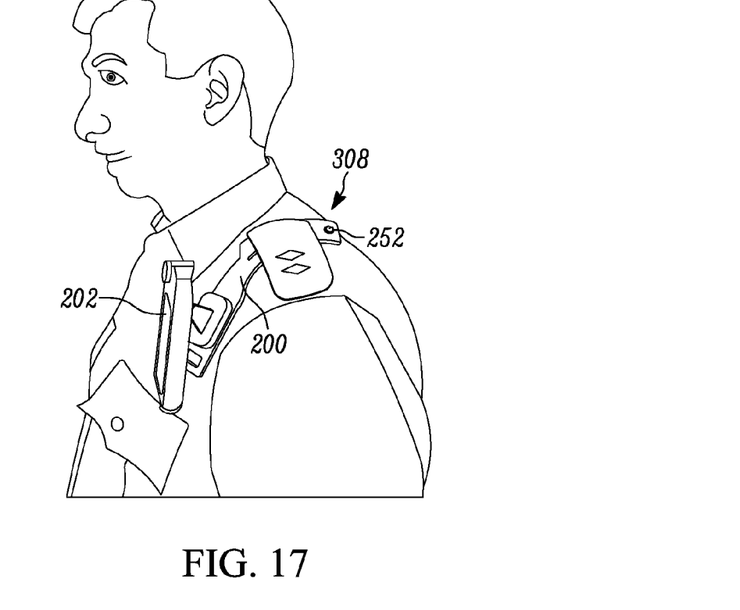
FIG. 17 is a side view of the person in the second uniform wearing the shoulder mount of FIGS. 11 through 12.
Figure 18:
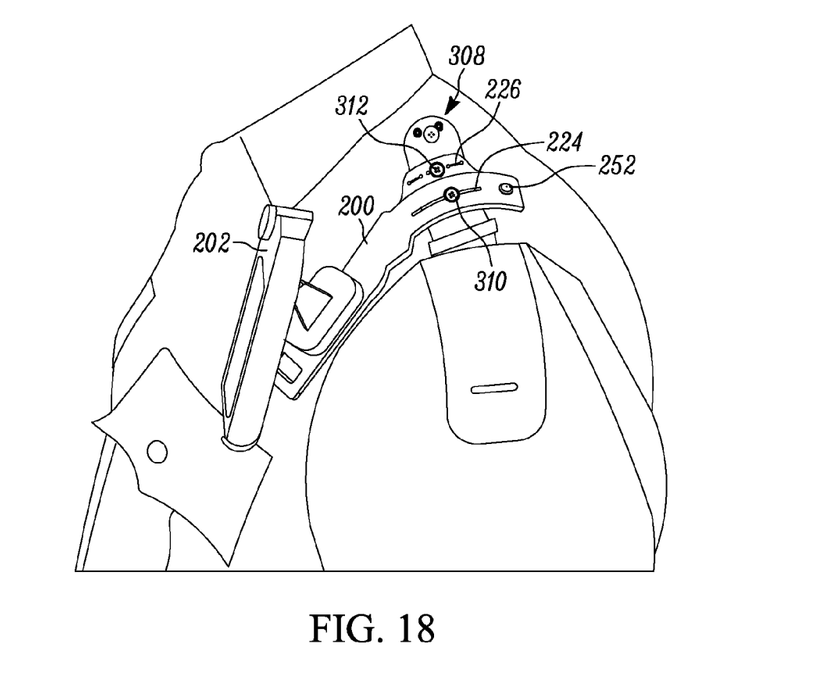
FIG. 18 is a top view of the person in the second uniform wearing the shoulder mount of FIGS. 11 through 12.

In FIGS. 16 through 18, the uniform includes an alternate style of epaulette 308 having a lower layer and an upper layer that folds over the lower layer when worn. Rather than the epaulette 308 being threaded through the slit 224, the slit 224 receives one piece 310 (e.g., a button) of a two-piece fastener, the slit 224 forming the other piece of the two-piece fastener. An additional piece 312 (e.g., a button) of an additional two-piece fastener is engaged with one of the additional slits 226. Although not required in all constructions, additional tethering locations may be established at one or both of the bottom ends 204B, 208B of the front and rear portions 204, 208 by a respective fastener piece 248, 252 of a two-piece fastener (e.g., snaps) as described with respect to the fastener pieces 148, 152 of the shoulder harness 100 described above.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A shoulder harness for supporting an electronic device, the shoulder harness comprising:
   a substrate having a pre-formed curvature such that the shoulder harness is biased to an at-rest state that is concave on a bottom-facing surface;
   a crest portion including a first tethering feature to secure the shoulder harness to a fastening element on a garment or other body-worn device;
   a front portion coupled to the crest portion and extending in a forward direction from the crest portion, wherein the front portion includes a receiving opening for attachment of the electronic device;
   a rear portion coupled to the crest portion and extending in a rearward direction from the crest portion; and
   a second tethering feature located on one of the crest, front, or rear portions and adapted for securing the shoulder harness to a fastening element on the garment or other body-worn device, the first and second tethering features being operable to separately fasten the shoulder harness at two separate locations along a user's shoulder when worn,
   wherein the first and second tethering features are spaced from each other transversely with respect to a direction of extension of the crest portion between the front and rear portions so that the two separate tethering locations are spaced in a medial-lateral direction along the user's shoulder when worn.

2. The shoulder harness of claim 1, wherein the pre-formed curvature is provided in the shape of an inverted "J".

3. The shoulder harness of claim 1, wherein the first tethering feature includes a first slit elongated in the direction of extension of the crest portion between the front and rear portions, and the second tethering feature includes a second slit spaced from the first slit in a direction transverse to the direction of extension of the crest portion between the front and rear portions.

4. The shoulder harness of claim 3, further comprising at least one additional slit aligned with the second slit along an axis parallel with the first slit.

5. The shoulder harness of claim 1, wherein the front portion includes a bottom end spaced remotely from the crest portion, and wherein one piece of a two-piece fastener is provided adjacent the bottom end.

6. The shoulder harness of claim 1, wherein the rear portion includes a bottom end spaced remotely from the crest portion, and wherein one piece of a two-piece fastener is provided adjacent the bottom end.

7. The shoulder harness of claim 1, further comprising a strap spanning the crest portion and having a pair of strap ends, at least one of the strap ends being releasably securable with a two-piece fastener operable by hand to selectively allow the strap to move from an open condition allowing movement of the strap away from the crest portion and a closed condition preventing movement of the strap away from the crest portion.

8. The shoulder harness of claim 1, further comprising a covering extending over the substrate, wherein the covering is provided at the bottom-facing surface with a non-slip texture.

9. The shoulder harness of claim 8, wherein the covering at the bottom-facing surface is constructed of rubberized vinyl.

10. The shoulder harness of claim 1, wherein the crest portion has a tapered conical shape in the at-rest state to conform to the shoulder, wherein a wider portion of the tapered conical shape defines a medial-facing edge of the shoulder harness and a narrower portion of the tapered conical shape defines a lateral-facing edge of the shoulder harness.

11. The shoulder harness of claim 1, wherein the first tethering feature is a first slit elongated in a direction of extension of the crest portion between the front and rear portions.

12. The shoulder harness of claim 1, wherein the receiving opening on the front portion is defined at least in part by a strap extending in a direction transverse to the forward and rearward directions and having opposing ends fixed relative to the substrate to define a loop therebetween.

13. The shoulder harness of claim 12, wherein the strap includes a top edge and a bottom edge, the top edge being nearer the crest portion, and wherein the strap is angled relative to the substrate such that the top edge is further from the substrate than the bottom edge.

14. A shoulder harness for supporting an electronic device, the shoulder harness comprising:
a substrate having a pre-curved compound curvature;
a crest portion;
a front portion extending in a forward direction from the crest portion;
a rear portion extending in a rearward direction from the crest portion;
multiple spaced-apart tethering locations, each tethering location defined by one piece of a two-piece fastener adapted to positively secure the shoulder harness with a garment or other wearable device including the other piece of the two-piece fastener;
a covering having a non-slip texture on a concave underside of the shoulder harness; and
a strap extending atop the crest portion to define a pair of strap ends spaced along the forward and rearward directions, at least one of the strap ends being releasably securable with a two-piece fastener operable by hand to selectively allow the strap to transition between an open condition allowing movement of the strap away from the crest portion so that a structure of the garment or other wearable device can be received between the crest portion and the strap, and a closed condition preventing movement of the strap away from the crest portion.

15. The shoulder harness of claim 14, wherein the crest portion has at least one slit elongated in a direction of extension of the crest portion between the front portion of the shoulder harness and the rear portion of the shoulder harness.

16. The shoulder harness of claim 14, wherein the front portion includes a strap defining a receiving opening for attachment of the electronic device.

17. The shoulder harness of claim 16, wherein the strap of the front portion includes a top edge and a bottom edge, the top edge being nearer the crest portion, and wherein the strap of the front portion is angled relative to the substrate such that the top edge is further from the substrate than the bottom edge.

18. The shoulder harness of claim 14, wherein the front portion includes a bottom end spaced remotely from the crest portion, and wherein one piece of a two-piece fastener is provided adjacent the bottom end.

19. The shoulder harness of claim 14, wherein the rear portion includes a bottom end spaced remotely from the crest portion, and wherein one piece of a two-piece fastener is provided adjacent the bottom end of the rear portion.

20. A shoulder harness for supporting an electronic device, the shoulder harness comprising:
a substrate having a pre-formed curvature such that the shoulder harness is biased to an at-rest state that is concave on a bottom-facing surface;
a crest portion including a first tethering feature to secure the shoulder harness to a fastening element on a garment or other body-worn device;
a front portion coupled to the crest portion and extending in a forward direction from the crest portion, wherein the front portion includes a receiving opening for attachment of the electronic device; and
a rear portion coupled to the crest portion and extending in a rearward direction from the crest portion,
wherein the receiving opening on the front portion is defined at least in part by a strap extending in a direction transverse to the forward and rearward directions and having opposing ends fixed relative to the substrate to define a loop therebetween, and
wherein the strap includes a top edge and a bottom edge, the top edge being nearer the crest portion, and wherein the strap is angled relative to the substrate such that the bottom edge is spaced from the substrate, and the top edge is spaced further from the substrate than the bottom edge.

21. The shoulder harness of claim 20, further comprising a second tethering feature located on one of the crest, front, or rear portions and adapted for securing the shoulder harness to a fastening element on the garment or other body-worn device, the first and second tethering features being operable to separately fasten the shoulder harness at two separate locations along a user's shoulder when worn.

22. The shoulder harness of claim 21, wherein the first tethering feature is a first slit and the second tethering feature includes at least one additional slit formed in the crest portion and extending along an axis parallel with the first slit.

23. The shoulder harness of claim 21, wherein the second tethering feature is provided at a bottom end of one of the front and rear portions.

24. The shoulder harness of claim 23, wherein the second tethering feature is one piece of a two-piece snap fastener.

25. The shoulder harness of claim 21, wherein the second tethering feature is provided in the front portion, the shoulder harness further comprising a third tethering feature provided in the rear portion.

26. The shoulder harness of claim 25, wherein at least one of the first, second, and third tethering features is spaced away from a central dividing plane that extends through the crest, front, and rear portions.

* * * * *